(12) United States Patent
Kusek

(10) Patent No.: US 6,955,735 B2
(45) Date of Patent: Oct. 18, 2005

(54) PULTRUSION WITH PLASTISOL

(76) Inventor: Walter W. Kusek, 2013 Kenilworth La., Wilmington, NC (US) 28405

( * ) Notice: Subject to any disclaimer, the term of this patent is extended or adjusted under 35 U.S.C. 154(b) by 0 days.

(21) Appl. No.: 10/406,778

(22) Filed: Apr. 2, 2003

(65) Prior Publication Data

US 2004/0001941 A1 Jan. 1, 2004

Related U.S. Application Data

(63) Continuation-in-part of application No. 09/773,837, filed on Jan. 31, 2001, now abandoned.

(51) Int. Cl.$^7$ .............................................. B29C 70/52
(52) U.S. Cl. ...................... 156/166; 156/180; 156/181; 156/242; 156/245
(58) Field of Search ................................ 156/166, 180, 156/181, 242, 245, 433, 441

(56) References Cited

U.S. PATENT DOCUMENTS

| | | | |
|---|---|---|---|
| 2,751,320 A | | 6/1956 | Jacobs et al. |
| 3,051,995 A | * | 9/1962 | Ferrell et al. ................ 264/103 |
| 3,091,547 A | * | 5/1963 | Jones .......................... 442/155 |
| 3,210,446 A | * | 10/1965 | Yamakawa et al. ......... 264/45.9 |
| 3,461,197 A | * | 8/1969 | Lemelson ............... 264/171.11 |
| 3,557,046 A | * | 1/1971 | Muskat ........................ 524/533 |
| 4,144,371 A | * | 3/1979 | Okie et al. ....................... 442/3 |
| 4,234,366 A | | 11/1980 | Brewer et al. ................. 156/79 |
| 4,259,379 A | * | 3/1981 | Britton et al. ................ 427/356 |
| 4,388,363 A | | 6/1983 | Fountain ...................... 428/215 |
| 4,464,432 A | | 8/1984 | Dost et al. ................... 428/280 |
| 4,505,968 A | | 3/1985 | Ishii et al. ................... 428/172 |
| 4,673,710 A | | 6/1987 | Burba et al. ............. 525/111.5 |
| 4,754,015 A | | 6/1988 | Thorsted ....................... 528/94 |
| 4,762,751 A | | 8/1988 | Girgis et al. ................ 428/378 |
| 4,842,667 A | | 6/1989 | Thorsted ...................... 156/166 |
| 4,861,621 A | | 8/1989 | Kanzaki ..................... 427/54.1 |
| 5,084,222 A | | 1/1992 | Glemet et al. ............... 264/136 |
| 5,137,952 A | | 8/1992 | Miller et al. ................. 524/140 |
| 5,176,865 A | | 1/1993 | Beall et al. .................. 264/174 |
| 5,382,619 A | | 1/1995 | Takayama et al. .......... 524/437 |
| 5,556,496 A | | 9/1996 | Sumerak ...................... 156/166 |
| 5,658,969 A | | 8/1997 | Gerace ......................... 523/218 |
| 5,739,203 A | | 4/1998 | Ngoc .......................... 524/527 |
| 5,874,152 A | | 2/1999 | Middelman ................. 428/105 |
| 5,989,376 A | | 11/1999 | Kusy et al. .................. 156/166 |

FOREIGN PATENT DOCUMENTS

| | | | |
|---|---|---|---|
| FR | 2831481 A1 | * | 5/2003 |
| JP | 46-11990 B | * | 3/1971 |

OTHER PUBLICATIONS

Users Guide to RP Industrial Equipment, Fiberglass Pultruded Structural Shapes, Corrosion–Resistant Structures Committee of the Composites Institute, The Society of the Plastics Industry, Inc., Feb. 1988.

* cited by examiner

*Primary Examiner*—Jeff H. Aftergut
(74) *Attorney, Agent, or Firm*—Joseph T. Guy; Nexsen Pruet, LLC

(57) ABSTRACT

A pultrusion machine for forming a laminated composite with a predetermined profile and the product obtained. The apparatus comprises at least two spools for supplying elongated reinforcements. A collator receives the elongated reinforcements and arranges the reinforcements in layered relationship to form a layered elongated bundle. A supply member wets the layered elongated bundle with plastisol to form a wetted elongated bundle. The wetted elongated bundle is transported through a pultrusion die wherein the wetted layered bundle is molded into the predetermined profile. A converting apparatus cures, or converts, the wetted layered bundle into the layered composite. A particularly preferred embodiment is an extrusion comprising a reinforcing material wherein said reinforcing material comprises a fiber reinforced plastisol.

24 Claims, 3 Drawing Sheets

PULTRUSION WITH PLASTISOL

RELATED APPLICATION

This application is a continuation-in-part of U.S. patent application Ser. No. 09/773,837 filed Jan. 31, 2001, now abandoned.

FIELD

The present invention relates to improved composites and the production thereof. More particularly, the present invention relates to the use of plastisol in a pultrusion system for fabricating composite structures which have improved properties.

BACKGROUND

Pultrusion is a well known technique for forming composite structures. In general, pultrusion involves the steps of unwinding a plurality of endless reinforcements, collating the reinforcements into a layered arrangement, wetting and/or saturating the reinforcements with a resin, and transporting the layered arrangement through a pultrusion die wherein the cross-sectional shape is formed and the resin cured.

Structural components in the form of beams, ribs, "J" stiffeners, "C" channels and "I" beams lend themselves well to the pultrusion process of manufacture. The strength to weight ratio of composite structural materials is many times higher than alloys of metal. This has led to extensive use in the aerospace industry. Other industries are expected to benefit as further improvements in laminated composites are made available.

Most typically the reinforcements are fabrics or fiber tows of graphite, fiberglass, Kevlar, and the like. The reinforcement is typically chosen based on strength and weight and the ability of the particular reinforcement to be wet by the resin of choice. Maximum strength is achieved, under some circumstances, when the resin completely saturates the reinforcement such that the final cross-section of the composite is a continuous polymerized resin with bands of reinforcement layered therein. If the resin fails to thoroughly wet, and saturate, the reinforcement the strength of the composite is compromised. In this instance the cross-section is discontinuous since there are regions which are void of polymerized resin or which have insufficient polymerized resin to achieve maximum strength. For a given choice of resins there is a limited choice of materials which can form the reinforcement. Conversely, for a given reinforcement choice the resin must be selected which will sufficiently saturate, or strongly adhere to, the reinforcement.

The properties of a resin must also be compatible with the demands of the pultrusion process. The pot life must be sufficient to allow a sufficient length of composite to be manufactured without premature curing or aging out. The resin must also be curable in a reasonable period of time. It is most preferred that the resin can be cured during the residence time in the pultrusion die to avoid relaxation or running of the resin after exiting the die. If the curing time is long the rate at which the reinforcement can be transported through the die is decreased and productivity of the manufacturing facility becomes unattractive and cost of the composite increases. Polyester resins, vinyl esters, urethanes and epoxy resins are known to be compatible with the pultrusion process but these resins have not exhibited the mechanical properties which are suitable for many usages or are limited in their ability to wet and saturate some reinforcement materials thereby limiting their use.

Exemplary pultrusion methods, materials and techniques are provided in U.S. Pat. Nos. 5,989,376; 5,176,865; 5,084,222; 4,338,363; 5,556,496; 4,754,015; 4,861,621 and 4,842,667.

It has been a long standing goal to expand the composite structures which can be achieved with the pultrusion processes. In many cases, this goal has been thwarted by the limited choice of resins available. It is one object of the present invention to provide a pultrusion process with new resins which can expand the properties which can be achieved with composite materials and the applications wherein they can be incorporated.

SUMMARY

It is an object of the present invention to provide a method for manufacturing improved composite laminates.

It is another object of the present invention to provide a pultrusion apparatus, and method of use, which can be used to make novel composite laminates.

It is yet another object of the present invention to provide a method whereby the properties of pultruded materials can be improved to create composite laminates with improved properties.

A particular advantage of the present invention is that the method can be accomplished utilizing materials which are relatively inexpensive and readily available.

A particular advantage is the suitability of the pultruded plastisol product as a reinforcement bar. Particularly, the pultruded plastisol product can be used as a reinforcement bar (rebar) in extruded products with the advantage being chemical resistance and low cost.

These, and other advantages, will be realized from the teachings herein, wherein provided is, a method of manufacturing a composite laminate comprising the steps of:

a) forming a bundle of at least two elongated reinforcements;

b) contacting the bundle with plastisol; and c) converting or curing the plastisol to form the composite laminate.

Another embodiment of the present invention is provided in a pultrusion machine for forming a laminated composite with a predetermined profile. The apparatus comprises at least two spools for supplying elongated reinforcements. A collator receives the elongated reinforcements and arranges the reinforcements in layered relationship to form a layered elongated bundle. A supply member wets the layered elongated bundle with plastisol to form a wetted elongated bundle. The wetted elongated bundle is transported through a pultrusion die wherein the wetted layered bundle is molded into the predetermined profile. A converting apparatus cures, or converts, the wetted layered bundle into the layered composite.

A particularly preferred embodiment is an extrusion comprising a reinforcing material wherein said reinforcing material comprises a fiber reinforced plastisol.

DETAILED DESCRIPTION

Pultrusion is known in the art to involve forming a laminate comprising a multiplicity of reinforcements, introducing a resin to the multiplicity of reinforcements, forming the laminate into a desired shape and curing, also known as converting, the resin thereby creating a cured laminate structure.

Figure 1:
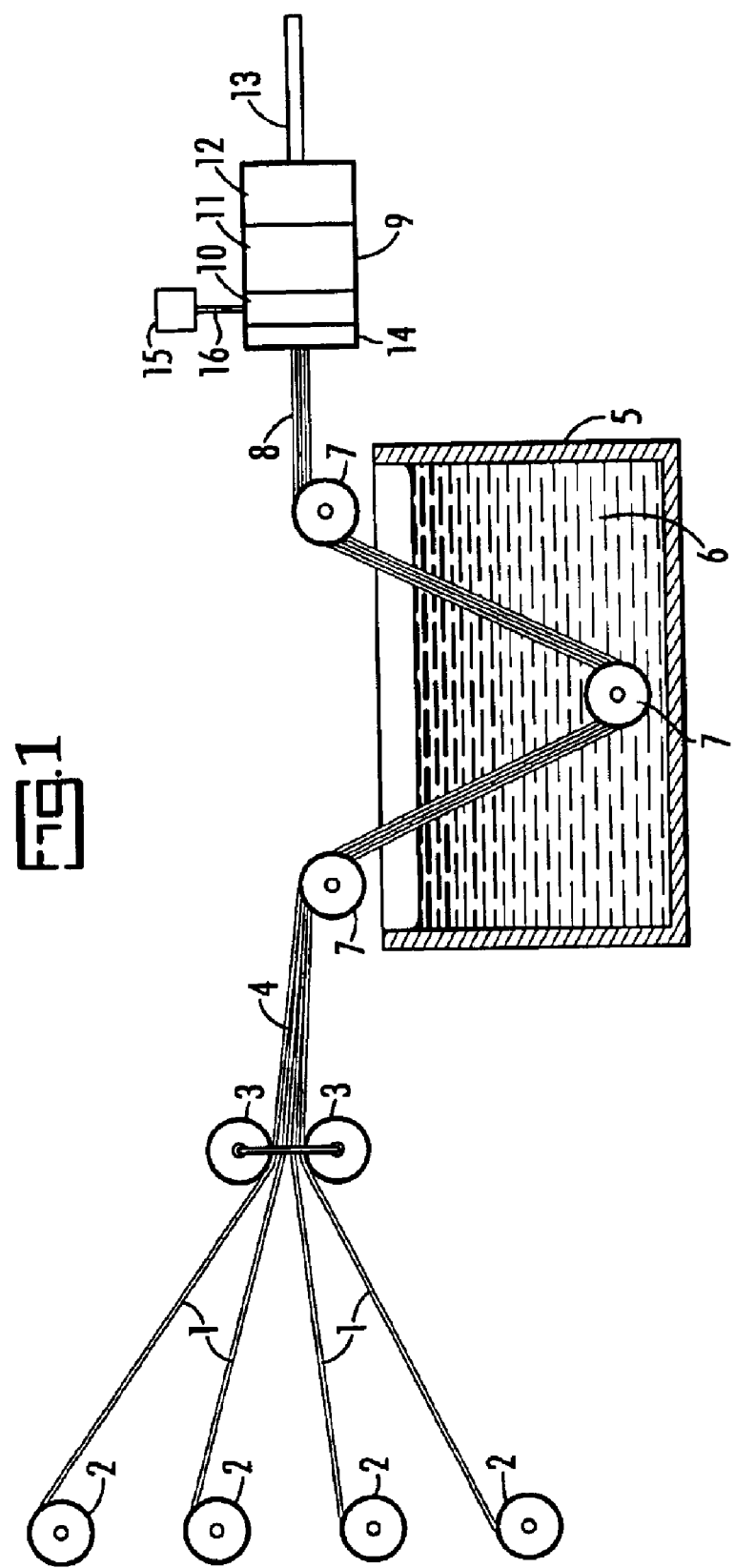
FIG. 1 is a schematic representation of a pultrusion machine.

A method for pultrusion will be described in more detail with reference to FIG. 1. In FIG. 1, a multiplicity of reinforcements, 1, are fed from spools, 2. The reinforcements, 1, transit through a collator, which preferably comprises bars or guides, 3, which align the multiplicity of reinforcements and bring them into close proximity thereby forming a bundle, 4. The bundle is then passed into a resin chamber, 5, wherein the resin chamber comprises resin, 6. In a particularly preferred embodiment the resin chamber is a supply member wherein the layered bundle is wet and impregnated with plastisol. Guide bars, 7, are preferably used to guide the reinforcements into and out of the resin tank. The resin, 6, wets and/or impregnates the reinforcement. The layered arrangement of reinforcements, or bundle, exits the resin tank as a wetted elongated bundle, 8, comprising the multiplicity of reinforcements and resin. The pultrusion die, 9, comprises a forming die, 10, wherein the wetted elongated bundle, 8 is formed into a predetermined cross-sectional shape such as is common with pultrusion dies. It is also well known in the art that resin can be injected into the pultrusion die, 9, by use of an injector, 15, and associated piping, 16. In a preferred embodiment an injector acts as a supply member wherein plastisol is injected into the pultrusion die thereby incorporating plastisol into the reinforcement matrix. A curing section, 11, cures, or converts, the resin thereby forming a laminate structure, 13, in the predetermined cross-section shape. An optional section, 12, can be used to cool the laminate structure, coat additional material on the outside of the laminate structure such as paint and the like, "B"-staging, or it may be used for additional curing if necessary. An optional, but preferred stripping die, 14, may be used to attain the desired resin to reinforcement ratio. Further shaping of the pultruded product may be accomplished, if desired, in the method referred to in the art as "B"-staging wherein the resin is partially cured, further formed, and then further cured.

A particular advantage of the present invention is the ability to utilize plastisol at ambient temperature. Elimination of the need for heating the resin in the resin tank increases the efficiencies of the pultrusion system relative to prior art techniques.

Figure 2:
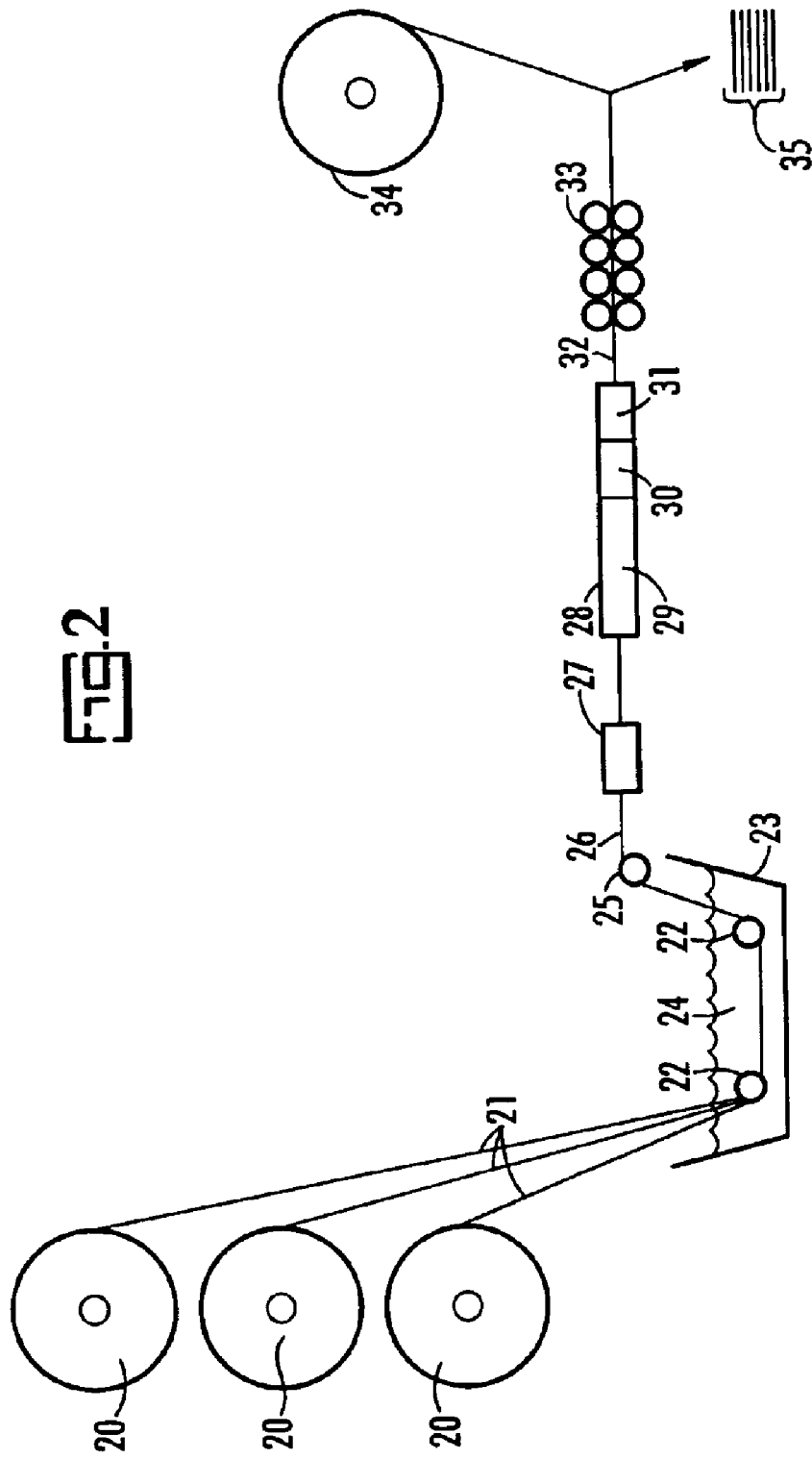
FIG. 2 is a schematic representation of an alternative pultrusion machine.

An alternative method for creating a fiber reinforced plastisol composite will be described in relation to FIG. 2. In FIG. 2 the continuous strands of reinforcement, 21, are fed from spools, 20. The reinforcement is then collated by a series of rollers, 22, and guided through a wet out pan, 23, containing plastisol, 24. A guide roller, 25, directs the layered bundle of reinforcement which is wetted with plastisol, 26, into an optional, but preferred, strip metering die, 27, wherein the ratio of plastisol to reinforcement is optimized. The wetted layered bundle of reinforcement is then directed into a heated curing die, 28, which is also referred to in the art as a heated conversion die. The heated curing die preferably comprises a pultrusion die region, 29, a curing section, 30 and an optional section which may be used to cool the laminate structure, coat additional material on the outside of the laminate such as paint and the like, "B"-staging or for additional curing if desired. The pultrision die region, 29 and curing section, 30, may be distinct regions within the heated curing die or they may be a single region with gradients of both structural configuration and curing if so desired. The laminate structure, 32, then transits a series of pull rollers, 33, prior to transiting to a wind up roller, 34, or a finishing operation for cutting into distinct lengths, 35, for use in Guy strain rods, fishing rods, reinforcement bar and the like. In one embodiment the reinforcement wetted with plastisol may be cut to length after the strip metering die and used in subsequent molding operations. It could be considered a PVC plastisol bulk moulding compound or sheet moulding compound.

In one embodiment, the pulled reinforced material may be further coated with plastisol.

Figure 3:
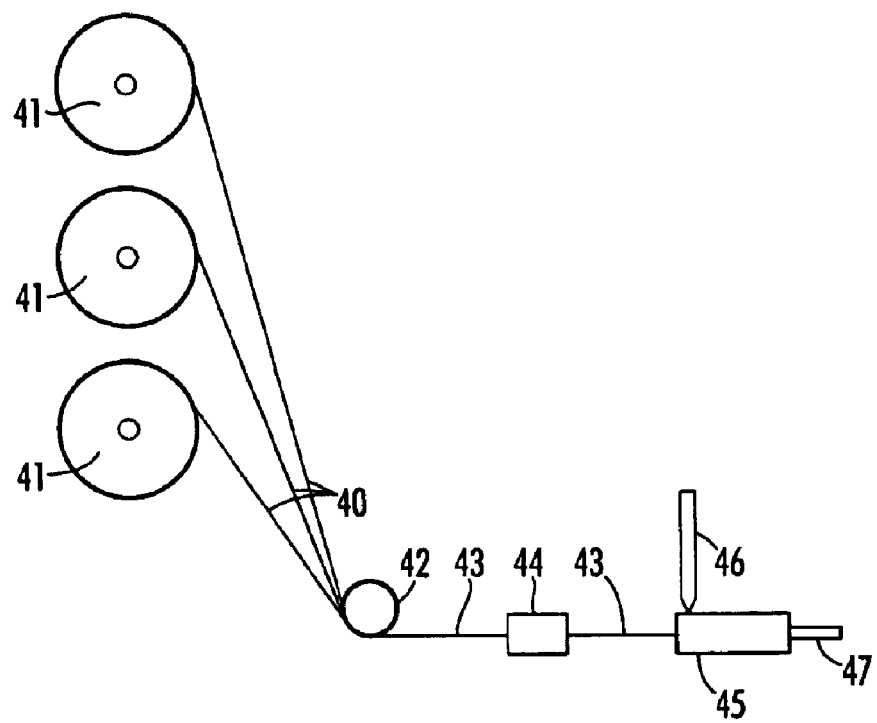
FIG. 3 is a schematic representation of an extrusion machine for incorporating a reinforced plastisol into a thermoplastic extrusion product.

An extrusion machine for incorporating a reinforced plastisol into an extruded element is illustrated in FIG. 3. In FIG. 3 the fiber reinforced plastisol, 40, is fed from a multiplicity of spools, 41. A guide bar, 42, collates and guides the layered bundle, 43, into an optional, but preferred, surface wetting die, 44. The surface wetting die typically wets the bundle with uncured plastisol to enhance the wetting of the bundle in subsequent steps which are to be described. It is preferable that the uncured plastisol used for wetting is the same used to form the fiber reinforced plastisol but this is not a requirement. Materials other than plastisol can be used provided that they adequately wet the surface of the fiber reinforced plastisol and that they are compatible with the remainder of the process. The layered bundle, 43, is then fed into an extruder die, 45, wherein a continuous shape is made as known in the art. A standard thermoplastic is fed into the extrusion die, 45, by an extruder, 46. The extrusion product, 47, comprising a thermoplastic with fiber reinforced plastisol as a reinforcement is then obtained.

In one embodiment, chopped reinforced material is added to plastisol. The plastisol containing chopped reinforcement is then further used as a reinforcement material in subsequent operations.

Figure 4:
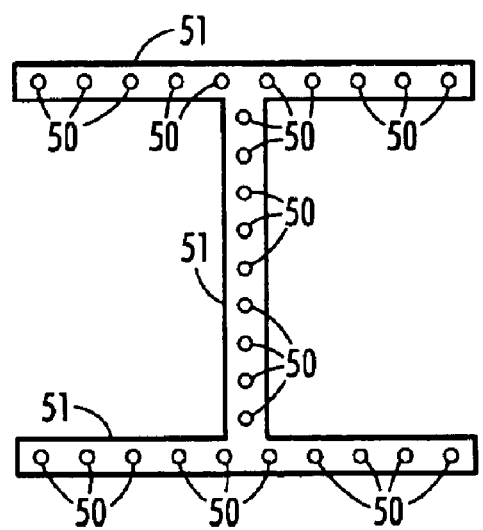
FIG. 4 is a preferred embodiment illustrating a reinforced plastisol as a reinforcement bar in a thermoplastic extruded product.

FIG. 4 illustrates an example of an inventive extrusion product wherein a fiber reinforced plastisol, 50, is the reinforcement bar of a thermoplastic, 51, in the form of, for this example an "I"-beam. Other cross-sectional shapes known in the art could be easily manufactured using the descriptions provided herein with standard extrusion techniques.

Plastisol is widely known to be a blend of high molecular weight polymeric resin, typically polyvinylchloride, in a non-volatile nonaqueous plasticizer. It is also known in the art that adjuvants such as fillers, stabilizers, adhesion promoters, and surfactants can be added to plastisol. It is most preferable that the plastisol content of the laminate be from about 20 to about 80 weight percent based on the total weight of the cured laminate material. More preferably, the plastisol content of the laminate is from about 30 to about 70 weight percent based on the total weight of the cured laminate material. Most preferably, the plastisol content of the laminate is from about 30 to about 60 weight percent based on the total weight of the cured laminate material.

Resins which are useful in the present invention include homopolymers and copolymers of polyvinylchloride. A homopolymer of vinylchloride is most preferred. Specific copolymers of vinylchloride include polymerized monomers of acrylate, specifically methacrylate; acrylonitrile, styrene, phenyleneoxide, acrylic acid, maleic anhydride, vinyl alcohol and vinyl acetate.

Plasticizers are preferably compounds with low volatility and which have the ability to disperse polymeric resin particles. It is also preferable that the plasticizers facilitate adherence of the polymeric resin to the fibers. Typical plasticizers include, normal and branched chain alcoholic esters and glycol esters of various mono-, di- and tri-basic acids, for example esters of phthalic, adipic, sebacic, azelaic, citric, trimellitic (and anhydride) and phosphoric acids; chlorohydrocarbons; esters of long chain alcohols; liquid polyesters; and epoxidized natural oils, such as linseed and soya oils. Representative phthalate plasticizers include: di-2-ethylhexyl phthalate, n-C6-C8-C10 phthalate, n-C7-C9-C11 phthalate, n-octyl-n-decyl phthalate, ditridecyl phthalate, diisonyl phthalate, diisooctyl phthalate, diisodecyl phthalate, butylbenzylphthalate, dihexyl phthalate, butyl ocytyl phthlate, dicapryl phthalate, di-2-ethylhexyl isophthalate, alkyl benzene phthalates, dimethyl phthalate, dibutyl phthalate, diisobutyl phthalate, butyl isodecyl phthalate, butyl iso-hexyl phthalate, diisononyl phthalate, dioctyl phthalate, hexyl octyl decyl phthalate, didecyl phthalate diisodecyl phthalate, diundecyl phthalate, butylethylhexyl phthalate, butylbenzyl phthalate, octylbenzyl phthalate, dicyclohexyl phthalate, diphenyl phthalate, aklylaryl phthalates, and 2-ethylhexylisodecyl phthalate. Additional plasticizers include: abietic derivatives are suitable such as: hydroabietyl alcohol, methyl abietate and hydrogenated methyl abietate; acetic acid derivatives such as cumylphenylacetate; adipic acid derivatives such as benzyloctyl adipate, dibutyl adipate, diisobutyl adipate, di-octyladipate, di-2-ethylhexyl adipate, diisononyl adipate, diisooctyl adipate, dinonyl adipate, $C_{7-9}$ linear adipate, dicapryl adipate, octyl decyl adipate (such as n-octyl, n-decyl adipate), straight chain alcohol adipate, didecyl adipate, diisodecyl adipate, dibutoxyethyl adipate, high molecular weight adipate, polypropylene adipate, modified polypropylene adipate; azelaic acid derivatives such as dicyclohexyl azelate, di-2-ethylhexyl azelate, di-n-hexyl azelate, diisooctyl azelate and diisodecyl adipate; benzoic acid derivatives such as diethylene glycol dibenzoate, dipropylene glycol dibenzoate, diethylene glycol benzoate and dipropylene glycol benzoate blend, neopentyl glycol dibenzoate, glyceryl tribenzoate, trimethylolethatane tribenzoate, pentaerythritol tribenzoate, cumylphenylbenzoate; polyphenyl derivatives such as hydrogenated terphenyl; citric acid derivatives, such as triethyl citrate, tri-n-butyl citrate, acetyl triethyl citrate, acetyl tri-n-butyl citrate, acetal tributyl citrate; epoxy derivatives such as butyl epoxy stearate, alkyl epoxy stearate, epoxidized butyl ester, epoxidized octyl tallage, epoxidized triglyceride, epoxidized soybean oil, epoxidized sunflower oil, epoxidized linseed oil, epoxidized tallate ester, 2-ethylhexyl-epoxy tallate, octyl epoxy stearate; ether derivatives such as cumylphenyl benzyl ether; formal derivatives such as butyl carbitol formal; fumaric acid derivatives such as dibutyl fumarate, diisooctyl fumarate, dioctyl fumarate; glutaric acid derivatives such as mixed dialkyl glutarates and dicumylphenyl glutarate; glycol derivatives such as diethylene glycol dipelargonate, triethylene glycol dipelargonate, triethylene glycol di-(2-ethylbutyrate), triethylene glycol di-caprylate-caprate, triethylene glycol di-(2-ethylhexoate), triethylene glycol decaprylate, tetraethylene glycol decaprylate, polyethylene glycol di-(2-ethylhexoate), butyl phthalyl butyl glycolate, triglycolester of vegetable oil fatty acid, triethylene glycol ester of fatty acid; linear dibasic acid derivatives such as mixed dibasic ester; petroleum derivatives such as aromatic hydrocarbons; isobutyric acid derivatives such as 2,2,4-trimethyl-,1,3-pentanediol diisobutyrate; isophthalic acid derivatives such as di(2-ethylhexyl)isophthalate, diisooctyl isophthalate, dioctylisophthalate; lauric acid derivatives such as butyllaurate, 1,2-propylene glycol monolaurate, ethylene glycol monoethyl ether laurate, ethylene glycol monobutyl ether laurate, glycerol monolaurate, polyethylene glycol-400-dilaurate; mellitic acid derivatives such as n-octyl, n-decyl trimellitate, tri-n-octyl-n-decyl trimellitate, triisononyl trimellitate, triisooctyl trimellitate, tricapryltrimellitate, diisooctyl monoisodecyl trimellitate, triisodecyl trimellitate, tri($C_{7-9}$ alkyl) trimellitate, tri-2-ethylhexyl trimellitate; nitrile derivatives such as fatty acid nitrile; oleic acid derivatives such as butyl oleate, 1,2-propylene glycol mono oleate, ethylene glycol monobutyl ether oleate, tetrahydrofurfuryl oleate, glycerlyl monoleate,; paraffin derivatives such as chlorinated paraffins, diethylene glycol dipelargonate, triethylene glycol dipelargonate, 2-butoxyethyl dipelargonate; phenoxy plasticizers such as acetyl paracumyl phenol; phosphoric acid derivatives such as tri-(2-ethylhexyl) phosphate, tributoxyethyl phosphate, triphenyl phosphate, cresyl diphenyl phosphate, tricresyl phosphate, tri-isopropylphenyl phosphate, alkyl aryl phosphates, diphenyl-xylenyl phosphate, phenyl isopropylphenyl phosphate 2-ethylhexyl diphenyl phosphate, and decyl diphenyl phosphate; ricinoleic acid derivatives such as methylacetyl riconoleate, n-butyl acetyl ricinoleate, glyceryl triacetyl ricinoleate; sebacic acid derivatives such as dimethyl sebacate, dibutyl sebacate and dibutoxyethyl sebacatel; stearic acid derivatives such as glyceryl tri-acetoxy stearate, butyl acetoxy stearate, methylpentachlorostearate and methoxyethyl acetoxy stearate; sucrose derivatives such as sucrose benzoate; sulfonic acid derivatives such as alkylsulfonic esters of phenol; tall oil derivatives such as methylester of tall oil and isooctyl ester of tall oil; and terephthalic acid derivatives such as dioctyl terephthalate.

Particularly preferred plasticizing resins include: di-2-ethylhexyl phthalate, n-C6-C8-C10 phthalate, n-C7-C9-C11 phthalate, diisooctyl phthalate, diisodecyl phthalate, butylbenzyl phthalate, dihexyl phthalate, diisononyl phthalate, di-2-ethylhexyl adipate, diisononyl adipate, diisodecyl adipate, di-2-ethylhexyl azelate, dipropylene glycol dibenzoate, epoxidized soybean oil and epoxidized linseed oil.

The term "reinforcement", as used herein, refers to reinforcing fibers including filaments, yarn, roving, mats, felt, ribbon, tape, fabric and the like in continuous form. The reinforcement is usually aligned parallel to the flow of material and includes stitched or braided fibers. Any combination of reinforcement materials can generally be used as long as they can be sufficiently wet by the resin to form a material with adequate properties. The number and orientation of the reinforcements used in a laminate will vary according to the specific cross-sectional shape desired, strength requirements, weight requirements and other considerations as known in the art. It is most preferable that the fiber content of the laminate be from about 20 to about 80 weight percent based on the total weight of the cured laminate material. More preferable, is a laminate with a fiber content of from about 30 to about 70 weight percent based on the total weight of the cured laminate material. Most preferably, the laminate has a fiber content of from about 40 to about 70 weight percent based on the total weight of the cured laminate material.

The reinforcement can be any conventional material known to the art for reinforcing laminates included metal fibers; glass fibers, such as E-glass, A-glass, C-glass, D-glass, AR-glass, R-glass, S1-glass, S2-glass; carbon fibers such as graphite; boron fibers; ceramic fibers such as alumina or silica; aramid fibers such as Kevlar® marketed by E. I. duPont de Nemours, Wilmington, Del.; synthetic organic fibers such as polyamide, polyethylene, paraphenylene, terephthalamide, polyethylene terephthalate and polyphenylene sulphide; and various other natural or synthetic inorganic or organic fibrous materials known to be useful for reinforcing thermosetting polymeric compositions, such as cellulose, asbestos, cotton and the like.

Particularly preferred reinforcements include: E-glass, A-glass, C-glass, D-glass, AR-glass, R-glass, S1-glass, S2-glass, graphite; boron, and aramid.

Curing may be accomplished by a variety of techniques known in the art including, thermal, photoactivation, e-beam or other radiation type curing, and others. In the present invention thermal curing or conversion is most preferred and a particularly preferred embodiment is curing at a temperature of 250–400° F.

EXAMPLES

A reinforcement of PPG-712-225 Glass and was introduced into a pultrusion die at 1–20 ft/min. A PVC plastisol which is a polyvinyl chloride dispersion available from Rutland Plastic Technologies, Inc., Pineville, N.C., as product code RDP-3267 was injected into the pultrusion die at a rate of 100 ml/min. The resulting laminate was cured at 340° F. for one minute. A comparative example was prepared using polyester as a resin. The resulting laminate was tested and found to have the properties shown in the Table.

TABLE

| | Inventive | Comparative |
|---|---|---|
| Tensile Strength (psi) | >86,000 | 120,000 |
| Flexural Strength (psi) | >75,500 | 100,000 |
| Flexural Modulus(×106) | >3 | 4 |
| Elongation(%) | 3.4 | 2.8 |

The inventive sample has properties which are immanently suitable for use as a pultruded device or as a reinforcement bar in an extruded element. The inventive material is especially suitable as a reinforcement due to adequate rheological properties, excellent chemical resistance and low cost.

The inventive PVC pultrusion, when added to a standard PVC or CPVC extrusion would enhance the applications of the extruded product by increasing the load bearing capability due to the intimate bonding between the pultruded reinforcement and the extrusion matrix.

A particular application is use in harsh chemical environments such as in salt water applications, tank and pipe design, and as a concrete reinforcement. The pultruded PVC is an excellent replacement for metal reinforcement bars since the pultruded PVC does not rust or corrode.

What is claimed is:

1. A method of manufacturing a structural composite laminate comprising the steps of:
    forming a bundle of at least two elongated reinforcements; contacting said bundle with plastisol; and
    converting said plastisol in a die to form said structural composite laminate and fixing dimensions of said structural composite laminate in said die.

2. The method of manufacturing a structural composite laminate of claim 1 wherein said structural composite laminate comprises from about 20 to about 80 percent plastisol based on the total weight of the converted laminate material.

3. The method of manufacturing a structural composite laminate of claim 1 wherein said structural composite laminate comprises from about 30 to about 60 percent plastisol based on the total weight of the converted laminate material.

4. The method of manufacturing a structural composite laminate of claim 1 wherein at least one reinforcement of said reinforcements is chosen from a group consisting of: metal fibers, glass fibers, carbon fibers, ceramic fibers, aramid fibers, synthetic organic fibers, synthetic inorganic fibers, natural inorganic fibers and natural organic fibrous materials.

5. The method of manufacturing a structural composite laminate of claim 4 wherein said reinforcement is chosen from a group consisting of metal fibers, E-glass, A-glass, C-glass, D-glass, AR-glass, R-glass, S1-glass, S2-glass, graphite fibers, boron fibers, alumina fibers, silica fibers, aramid fibers, polyamide fibers, polyethylene fibers, paraphenylene fibers, terephthalamide fibers, polyethylene terephthalate fibers, polyphenylene sulphide fibers, cellulose fibers, asbestos fibers and cotton fibers.

6. The method of manufacturing a structural composite laminate of claim 1 wherein said plastisol comprises polyvinylchloride and a plasticizer.

7. The method of manufacturing a structural composite laminate of claim 6 wherein said polyvinylchloride is a copolymer formed from vinyl chloride monomer and at least one monomer chosen from the group consisting of methacrylate, acrylonitrile, styrene, phenyleneoxide, acrylic acid, maleic anhydride, vinyl alcohol and vinyl acetate.

8. The method of manufacturing a structural composite laminate of claim 6 wherein said plasticizer is chosen from a group consisting of di-2-ethylhexyl phthalate, n-C6-C8-C10 phthalate, n-C7-C9-C11 phthalate, diisooctyl phthalate, diisodecyl phthalate, butylbenzyl phthalate, dihexyl phthalate, diisononyl phthalate, di-2-ethylhexyl adipate, diisononyl adipate, diisodecyl adipate, di-2-ethylhexyl azelate, dipropylene glycol dibenzoate, epoxidized soybean oil and epoxidized linseed oil.

9. The method of claim 1 wherein said converting of said plastisol is by heating at 250–400° F.

10. The method of claim 1 further comprising a plastisol bath and said reinforcements enter said plastisol bath and plastisol is applied to said reinforcements in said plastisol bath.

11. The method of claim 10 further comprising a die for forming said laminate and said plastisol is injected into said die.

12. The method of claim 1, further comprising cutting said structural composite laminate to length.

13. A method of manufacturing a structural composite laminate comprising the steps of:
    forming a bundle of at least two elongated reinforcements; contacting said bundle with plastisol; and
    converting said plastisol in a die to form said structural composite laminate further comprising the step of:
    molding said layered arrangement into a predetermined cross-sectional configuration prior to said converting of said plastisol in said die.

14. A method of manufacturing comprising: collating at least two elongated reinforcements;
    wetting the collated reinforcements with a plastisol by pulling said collated reinforcements through a bath of said plastisol whereby said plastisol is in surface contact with each of said at least two elongated reinforcements;

pulling the plastisol-wetted collated reinforcements through a forming die; and curing the plastisol component of said plastisol-wetted collated reinforcements in a die to produce a structural composite laminate and fixing dimensions of said composite structural laminate in said die.

15. The method of claim 14 wherein said structural composite laminate comprises from about 20 to about 80 percent plastisol based on the total weight of said cured composite.

16. The method of claim 14 wherein at least one of said elongated reinforcements is selected from the group consisting of metal fiber, glass fiber, carbon fiber, ceramic fiber, aramid fiber, synthetic organic fiber, synthetic inorganic fiber, natural inorganic fiber and natural organic fibrous material.

17. The method of claim 14 wherein said reinforcements are selected from the group consisting of metal fiber, E-glass, A-glass, C-glass, D-glass, AR-glass, R-glass, S1-glass, S2-glass, graphite fiber, boron fiber, alumina fiber, silica fiber, aramid fiber, polyamide fiber, polyethylene fiber, paraphenylene fiber, terephthalamide fiber, polyethylene terephthalate fiber, polyphenylene sulphide fiber, cellulose fiber, asbestos fiber and cotton fiber.

18. The method of claim 14 wherein said plastisol comprises polyvinylchloride and a plasticizer.

19. The method of claim 18 wherein said polyvinylchloride is a copolymer formed from vinyl chloride monomer and at least one monomer chosen from the group consisting of methacrylate, acrylonitrile, styrene, phenyleneoxide, acrylic acid, maleic anhydride, vinyl alcohol and vinyl acetate.

20. The method of claim 18 wherein said plasticizer is selected from the group consisting of di-2-ethylhexyl phthalate, n-C6-C8-c10 phthalate, n-C7-C9-C11 phthalate, diisooctyl phthalate, diisodecyl phthalate, butylbenzyl phthalate, dihexyl phthalate, diisononyl phthalate, di-2-ethylhexyl adipate, diisononyl adipate, diisodecyl adipate, di-2-ethylhexyl azelate, dipropylene glycol dibenzoate, mellitic acid esters, phosphate esters, epoxidized soybean oil and epoxidized linseed oil.

21. The method of claim 14, wherein said bath is an ambient temperature bath.

22. The method of claim 14, wherein said curing of said plastisol component is by thermal curing.

23. The method of claim 14, wherein said curing of said plastisol component is by heating at 250–400° F.

24. The method of claim 14, further comprising extruding a thermoplastic material and a plurality of said structural composite laminate to produce an extruded element comprising said plurality of said reinforced shaped composites.

* * * * *